(12) United States Patent
Wu

(10) Patent No.: US 12,193,067 B2
(45) Date of Patent: Jan. 7, 2025

(54) METHOD AND APPARATUS OF DETERMINING RA-RNTI AND USER EQUIPMENT

(71) Applicant: GUANGDONG OPPO MOBILE TELECOMMUNICATIONS CORP., LTD., Guangdong (CN)

(72) Inventor: Zuomin Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 465 days.

(21) Appl. No.: 17/717,162

(22) Filed: Apr. 11, 2022

(65) Prior Publication Data
US 2022/0240325 A1    Jul. 28, 2022

Related U.S. Application Data (63) Continuation of application No. PCT/CN2020/118327, filed on Sep. 28, 2020.

(30) Foreign Application Priority Data

Oct. 15, 2019   (WO) ................. PCT/CN2019/111328

(51) Int. Cl.
*H04W 74/0833*   (2024.01)
(52) U.S. Cl.
CPC ............... *H04W 74/0833* (2013.01)
(58) Field of Classification Search
CPC .................................. H04W 74/0833

USPC ................. 370/328, 329, 330, 331
See application file for complete search history.

(56) References Cited

U.S. PATENT DOCUMENTS

2019/0268947 A1    8/2019  Zhang et al.
2021/0168862 A1*   6/2021  Murray ............... H04W 74/002

FOREIGN PATENT DOCUMENTS

| CA | 3100571 A1 * | 11/2019 | .......... H04W 72/044 |
| CN | 109076598 | 12/2018 | |
| CN | 109495222 | 3/2019 | |
| CN | 109803445 | 5/2019 | |
| WO | WO-2021064439 A1 * | 4/2021 | |

OTHER PUBLICATIONS

Oppo, "Initial access signals/channels for NR-U", 3GPP TSG RAN WG1 #98bis R1-1910787, Oct. 2019, pp. 1-8.
(Continued)

*Primary Examiner* — David Q Nguyen
(74) *Attorney, Agent, or Firm* — JCIP GLOBAL INC.

(57) ABSTRACT

Disclosed is a method of determining a random access radio network temporary identifier (RA-RNTI) and related product. In the method, a first indication of a plurality of frequency domain random access occasions (ROs) M_RO over which physical random access channel (PRACH preamble) is transmitted is obtained, a second indication about a set of PRACH sequence candidates to be selected for PRACH preamble transmission is obtained, an initial RO index is determined; and the RA-RNTI is determined based on the initial RO index and the PRACH sequence transmitted over the M_RO.

15 Claims, 3 Drawing Sheets

(56) References Cited

OTHER PUBLICATIONS

Oppo, "Summary of Email discussion [105#50][NR-U] RACH 4-step and SR", 3GPP TSG-RAN WG2 Meeting #105bis R2-1903282, Apr. 2019, pp. 1-39.
Samsung, "Random Access Response Reception in NR-U", 3GPP TSG-RAN2 105 R2-1900136, Feb. 2019, pp. 1-3.
"Search Report of Europe Counterpart Application No. 20876478. 7", issued on Dec. 12, 2022, pp. 1-9.
Huawei et al., "Remaining issues on physical random access channel and procedure", 3GPP TSG RAN WG1 Meeting #95 R1-1812179, Nov. 2018, pp. 1-4.
"International Search Report (Form PCT/ISA/210) of PCT/CN2020/118327", mailed on Dec. 31, 2020, pp. 1-4.
"Written Opinion of the International Searching Authority (Form PCT/ISA/237) of PCT/CN2020/118327", mailed on Dec. 31, 2020, pp. 1-3.

* cited by examiner

RO#0 is the initial RO index

METHOD AND APPARATUS OF DETERMINING RA-RNTI AND USER EQUIPMENT

CROSS-REFERENCE TO RELATED APPLICATION

This application is a continuation of international application of PCT application serial no. PCT/CN2020/118327 filed on Sep. 28, 2020, which claims the priority benefit of international PCT application serial no. PCT/CN2019/111328, filed on Oct. 15, 2019. The entirety of each of the above mentioned patent applications is hereby incorporated by reference herein and made a part of this specification.

TECHNICAL FIELD

The disclosure relates to the field of mobile communications, and in particular to a method of determining a random access radio network temporary identifier (RA-RNTI).

BACKGROUND

As Rel.15 PRACH only transmits over one RO, but in NRU, UE needs to transmit over multiple ROs, there raises an issue: if multiple ROs are used for PRACH preamble transmission, which RO should be used to determine the RA-RNTI is an open problem. Moreover the number of ROs that were used to differentiate RA-RNTI is reduced greatly.

SUMMARY

Embodiments of the present provide a method and apparatus of defining/determining the RA-RNTI, and a user equipment.

According to a first aspect, the disclosure provides s method of determining a random access radio network temporary identifier (RA-RNTI), executed by a user equipment (UE). The method includes operations of obtaining a first indication of a plurality of frequency domain random access occasions (ROs) M_RO over which physical random access channel (PRACH preamble) is transmitted; obtaining a second indication about a set of PRACH sequence candidates to be selected for PRACH preamble transmission; determining an initial RO index; and determining the RA-RNTI based on the initial RO index and the PRACH sequence transmitted over the M_RO.

According to a second aspect, the disclosure provides apparatus of determining a random access radio network temporary identifier (RA-RNTI). The apparatus includes an obtaining unit, configured to obtain a first indication of a plurality of frequency domain random access occasions (ROs) M_RO over which physical random access channel (PRACH preamble) is transmitted, and obtain a second indication about a set of PRACH sequence candidates to be selected for PRACH preamble transmission; and a determination unit, configured to determine an initial RO index, and determine the RA-RNTI based on the initial RO index and the PRACH sequence transmitted over the M_RO.

According to a third aspect, the disclosure provides a user equipment, which may include a memory and a processor. The memory stores a computer program. The processor is adapted to call and execute the computer program in the memory to execute the method according to the first aspect.

According to a fourth aspect, the disclosure provides a chip, configured to implement the method according to the first aspect. Specifically, the chip may include a processor. The processor is adapted to call and execute one or more computer programs in a memory, to cause a device configured with the chip to execute the method according to the first aspect.

According to a fifth aspect, the disclosure provides a computer-readable storage medium storing one or more computer programs. The computer programs may cause a processor to execute the method according to the first aspect.

According to a sixth aspect, the disclosure provides a computer program product including computer program instructions. The computer program instructions may cause the processor to execute the method according to the first aspect.

According to a seventh aspect, the disclosure provides a computer program. The computer program, when executed by a processor, causes the processor to execute the method according to the first aspect.

BRIEF DESCRIPTION OF DRAWINGS

The accompanying drawings described herein which are incorporated into and form a part of the disclosure are provided for the better understanding of the disclosure, and exemplary embodiments of the disclosure and description thereof serve to illustrate the disclosure but are not to be construed as improper limitations to the disclosure. In the accompanying drawings.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

In order to facilitate the understanding of the technical solutions of the disclosure, a table of acronyms and their full names mentioned in the following embodiments of the disclosure is given below.

TABLE 1

| acronym | Full name |
| --- | --- |
| LTE | Long Term Evolution |
| LTE-A | Advanced long term evolution |
| NR | New Radio |
| NR-U | New Radio-unlicensed |
| BS | Base-station |

TABLE 1-continued

| acronym | Full name |
| --- | --- |
| UE | User Equipment |
| PDCCH | Physical Downlink Control CHannel |
| DCI | Downlink Control Information |
| SSB | SS/PBCH block |
| CORESET | Control Resource Set |
| DMRS | DeModulation Reference Signal |
| MIB | Master information block |
| DCI | Downlink control information |
| LBT | Listen Before Talk |
| COT | Channel Occupancy Time |
| QCL | quasi co-located |

As Rel.15 PRACH only transmits over one RO, but in NRU, UE needs to transmit over multiple ROs, there raises an issue: if multiple ROs are used for PRACH preamble transmission, which RO should be used to determine the RA-RNTI is an open problem. Moreover the number of ROs that were used to differentiate RA-RNTI is reduced greatly. In this invention, a method of defining the RA-RNTI is disclosed.

NR Rel.15 PRACH

Figure 1:
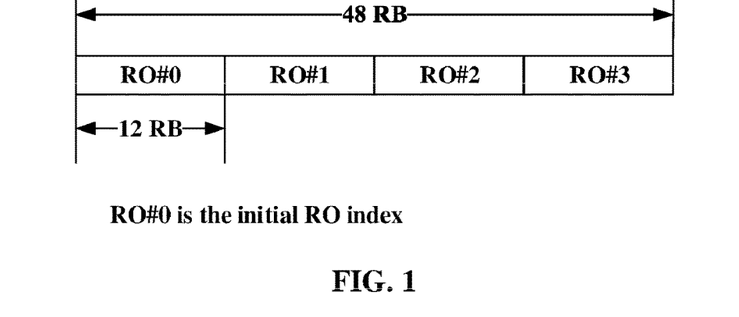
FIG. 1 illustrates a diagram of the structure of ROs configured by the network in the initial BWP.

In NR Rel. 15, the PRACH is transmitted in the initial BWP which can be configured having 24, 48, 96 RB. In the initial BWP, the network can configure multiple RACH occasion (RO) with each RO containing 12 RBs. These multiple ROs can be configured in time domain and/or in frequency domain. Once the UE obtains the RO configuration, it will select one RO to PRACH transmission. The PRACH is obtained by selecting one sequence out of a pre-defined sequence group, which contains max 64 sequences for UE selection. FIG. 1 illustrates an example, in which the PRACH is transmitted in the initial BWP which is configured having 48 RBs.

PRACH in NRU

In unlicensed band, there is a regulation imposing that for every transmission in a 20 Mhz band, the actual transmission has to ensure at least 80% of the bandwidth usage, aka., Occupancy channel bandwidth (OCB) requirement. For a NRU system with 30 Khz subcarrier space, if the network configures 48 RB initial BWP (i.e. 17.28 Mhz bandwidth), and if the UE reuses Rel.15 PRACH over one selected RO (1 RO=360 Khz bandwidth). Thus the OCB requirement is not satisfied. To solve this OCB issue, the UE has to transmit PRACH over multiple frequency domain ROs, e.g. transmit over RO #0,1,2,3 simultaneously or over RO #0,3, simultaneously. Note that the OCB regards the bandwidth between lowest frequency up to the highest frequency of the transmission, which does not impose a transmission without gap in the transmission spectrum. Thus, transmission over RO #0~3 is equivalent to over RO #0,3.

RA-RNTI in Rel.15

In Rel.15 only one RO is used to transmit PRACH preamble, then the RA-RNTI depends on the transmitted RO index.

Quote 3GPP specification for RA-RNTI definition $$RA\text{-}RNTI = 1 + s\_id + 14 \times t\_id + 14 \times 80 \times f\_id + 14 \times 80 \times 8 \times ul\_carrier\_id$$

where s_id is the index of the first OFDM symbol of the PRACH occasion ($0 \leq s\_id < 14$), t_id is the index of the first slot of the PRACH occasion in a system frame ($0 \leq t\_id < 80$), f_id is the index of the PRACH occasion in the frequency domain ($0 \leq f\_id < 8$), and ul_carrier_id is the UL carrier used for Random Access Preamble transmission (0 for NUL carrier, and 1 for SUL carrier).

As Rel.15 PRACH only transmits over one RO, but in NRU, UE needs to transmit over multiple ROs, there raises an issue: if multiple ROs are used for PRACH preamble transmission, which RO should be used to determine the RA-RNTI is an open problem. Moreover the number of ROs that were used to differentiate RA-RNTI is reduced greatly. In this invention, a method of defining the RA-RNTI is disclosed.

Figure 2:
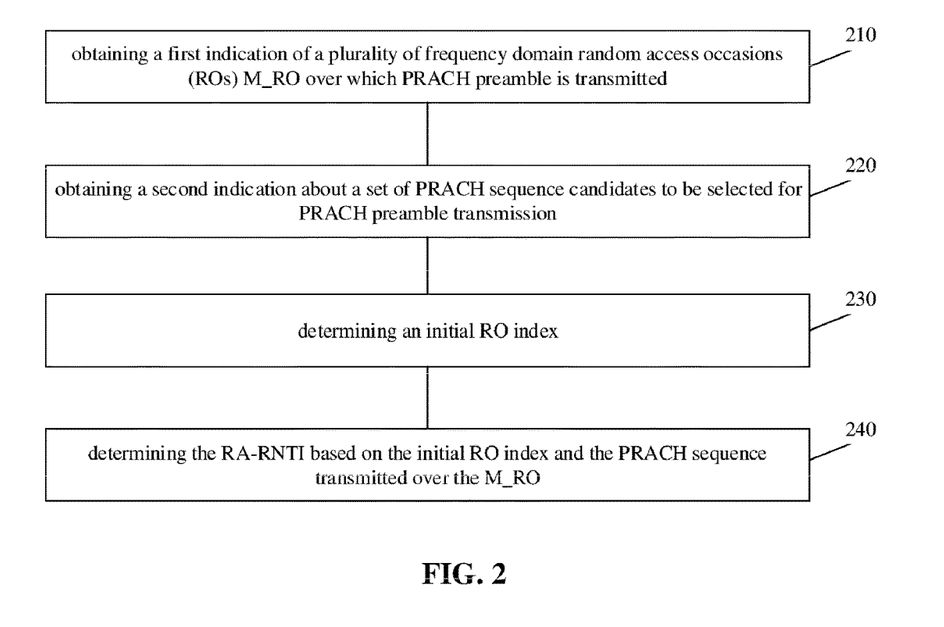
FIG. 2 illustrates a flow chart of a method of determining RA-RNTI according to an embodiment of the disclosure.

FIG. 2 illustrates a flow chart of a method of determining RA-RNTI according to an embodiment of the disclosure. The method may be applied in a NRU system and executed by a UE. This method could be adopted in, e.g., the 5G NR non-licensed band communications. The method includes the following operations illustrated in blocks.

In block 210, a first indication of a plurality of frequency domain random access occasions (ROs) M_RO over which physical random access channel (PRACH preamble) is transmitted is obtained.

In block 220, a second indication about a set of PRACH sequence candidates to be selected for PRACH preamble transmission is obtained.

In block 230, an initial RO index is determined.

In block 240, the RA-RNTI is determined based on the initial RO index and the PRACH sequence transmitted over the M_RO.

In an implementation, the plurality of ROs M_RO may have different frequency domain RO indexes or a same frequency domain RO index.

In an implementation, the UE may determine the initial RO index such that:
  if the plurality of ROs M_RO have different frequency domain RO indexes, the initial RO index is a smallest RO index among them; or a largest RO index among them;
  if the plurality of ROs M_RO have the same frequency domain RO index, the initial RO index is the frequency domain RO index.

In an implementation, the UE may determine the RA-RNTI such that a value of the RA-RNTI has a first pre-defined relationship between on the initial RO index and a first offset, where the first offset has a second relationship with the transmitted PRACH sequence over the plurality of ROs M_RO.

In an implementation, the second relationship between the first offset and the PRACH sequence can be derived by a PRACH sequence group, such that different PRACH sequences can be divided into multiple groups, and each group represents an offset value.

In an implementation, the offset value can be group ID, or other pre-defined values linked to group ID with pre-defined mapping.

In an implementation, the first relationship is $RA\text{-}RNTI = 1 + s\_id + 14 \times t\_id + 14 \times 80 \times f\_id\_nru + 14 \times 80 \times 8 \times ul\_carrier\_id$, where s_id is an index of the first OFDM symbol of the PRACH occasion ($0 \leq s\_id < 14$), t_id is an index of the first slot of the PRACH occasion in a system frame ($0 \leq t\_id < 80$), f_id_nru is an index of the NRU PRACH occasion in the frequency domain ($0 \leq f\_id\_nru < 8$), and ul_carrier_id is the UL carrier used for Random Access Preamble transmission (0 for NUL carrier, and 1 for SUL carrier), and f_id_nru is derived by the initial RO index and the PRACH sequence transmitted over M_RO according to the second relationship.

In an example, UE uses 4 frequency domain ROs to transmit PRACH preamble. These 4 ROs have different RO index, thus UE will determine one initial RO index for RA-RNTI determination, such that the initial RO index can be the smallest (or largest) RO index among these 4 RO index. In FIG. 1, UE can determine that RO #0 is the initial RO index. Note that if multiple frequency domain ROs share the same RO index, then this RO index is the initial RO index. As illustrated in FIG. 1, the UE determines the initial frequency domain RO index among multiple frequency domain ROs for PRACH preamble transmission.

Figure 3:
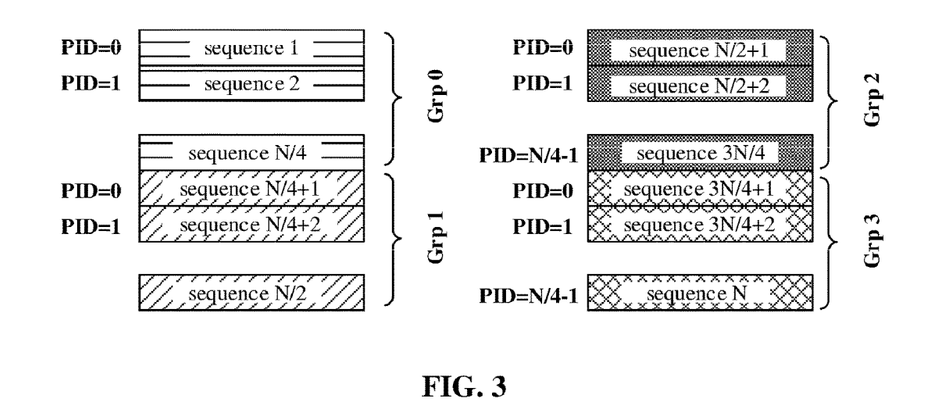
FIG. 3 illustrates a diagram of separating N different sequences into 4 groups.

As illustrated in FIG. 3, N different sequences can be separated into 4 groups with group ID 0~3. In each group, different sequences have different preamble ID (0~N/4−1).

Then the UE will determine the picked sequence belongs to which group. In the example, it is assumed that there are N different sequences and they are uniformly separated into 4 groups, each group having N/4 sequences. For each group, the preamble ID can be defined from PID=mod (sequence ID, N/4) leading to each group having N/4 preamble ID, i.e. 0 . . . N/4−1.

The actual RA-RNTI can be determined by $$RA\text{-}RNTI = 1 + s\_id + 14 \times t\_id + 14 \times 80 \times f\_id\_nru + 14 \times 80 \times 8 \times ul\_carrier\_id$$

where s_id is the index of the first OFDM symbol of the PRACH occasion (0≤s_id<14), t_id is the index of the first slot of the PRACH occasion in a system frame (0≤t_id<80), f_id_nru is the index of the NRU PRACH occasion in the frequency domain (0≤f_id_nru<8), and ul_carrier_id is the UL carrier used for Random Access Preamble transmission (0 for NUL carrier, and 1 for SUL carrier).

$$f\_id\_nru = \text{initial RO index} + \text{group index}$$

In the example, if UE selects the sequence in group 0, then f_id_nru=initial RO index+group ID=0+0=0. If UE selects the sequence in group 1, then f_id_nru=initial RO index+group ID=0+1=1.

Note that if the initial RO index is the largest RO index among all the frequency domain RO index, i.e. initial RO index=3 in the example, then f_id_nru can be changed to $$f\_id\_nru = \text{initial RO index} - \text{group index}$$

Figure 4:
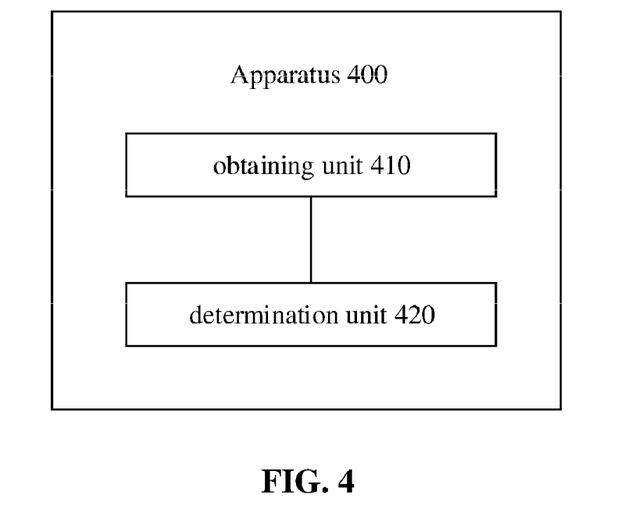
FIG. 4 illustrates a block diagram of an apparatus of determining RA-RNTI according to an embodiment of the disclosure.

FIG. 4 illustrates a block diagram of an apparatus 400 of determining a random access radio network temporary identifier (RA-RNTI).

The apparatus includes an obtaining unit 410, configured to obtain a first indication of a plurality of frequency domain random access occasions (ROs) M_RO over which physical random access channel (PRACH preamble) is transmitted, and obtain a second indication about a set of PRACH sequence candidates to be selected for PRACH preamble transmission.

The apparatus further includes a determination unit 420, configured to determine an initial RO index, and determine the RA-RNTI based on the initial RO index and the PRACH sequence transmitted over the M_RO.

In an implementation, the plurality of ROs M_RO may have different frequency domain RO indexes or a same frequency domain RO index.

In an implementation, the determination unit 420 may be configured to determine the initial RO index such that:
   if the plurality of ROs M_RO have different frequency domain RO indexes, the initial RO index is a smallest RO index among them; or a largest RO index among them;
   if the plurality of ROs M_RO have the same frequency domain RO index, the initial RO index is the frequency domain RO index.

In an implementation, the determination unit 420 may be configured to determine the RA-RNTI such that a value of the RA-RNTI has a first pre-defined relationship between on the initial RO index and a first offset, where the first offset has a second relationship with the transmitted PRACH sequence over the plurality of ROs M_RO.

In an implementation, the second relationship between the first offset and the PRACH sequence can be derived by a PRACH sequence group, such that different PRACH sequences can be divided into multiple groups, and each group represents an offset value.

In an implementation, the offset value may be group ID, or other pre-defined values linked to group ID with pre-defined mapping.

In an implementation, the first relationship may be RA-RNTI=1+s_id+14×t_id+14×80×f_id_nru+14×80× 8×ul_carrier_id, where s_id is an index of the first OFDM symbol of the PRACH occasion (0≤s_id<14), t_id is an index of the first slot of the PRACH occasion in a system frame (0≤t_id<80), f_id_nru is an index of the NRU PRACH occasion in the frequency domain (0≤f_id_nru<8), and ul_carrier_id is the UL carrier used for Random Access Preamble transmission (0 for NUL carrier, and 1 for SUL carrier), and f_id_nru is derived by the initial RO index and the PRACH sequence transmitted over M_RO according to the second relationship.

Figure 5:
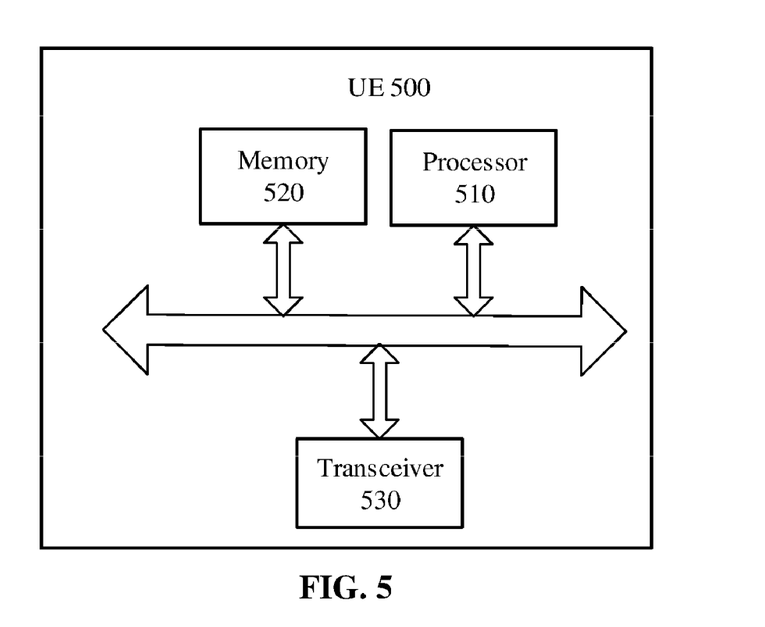
FIG. 5 illustrates a block diagram of a UE according to an embodiment of the disclosure.

FIG. 5 illustrates a block diagram of a UE 500 according to an embodiment of the disclosure. The electronic device may be any device with a computing processing capability such as a terminal or a server. As illustrated in FIG. 5, the electronic device may include a processor 510. The processor 510 may call and execute the computer programs in a memory to execute the method in the embodiments of the disclosure.

In at least one embodiment, as illustrated in FIG. 5, the UE 500 may further include a memory 520. The processor 510 may call and execute the computer programs in the memory 520 to execute the method in the embodiments of the disclosure.

The memory 520 may be a separate device from the processor 510, or may be integrated into the processor 510.

In at least one embodiment, as illustrated in FIG. 5, the UE 500 may further include a transceiver 530. The processor 510 may control the transceiver 530 to communicate with another device. Specifically, the processor 510 may control the transceiver 530 to send information or data to another device, or receive information or data from another device.

The transceiver 530 may include a transmitter and a receiver. The transceiver 530 may further include one or more antennas.

Alternatively, the UE 500 may specifically be a terminal/mobile terminal in the embodiments of the disclosure. The UE 500 may implement a corresponding process implemented by the terminal/mobile terminal in each method embodiment of the disclosure, which will not be elaborated herein for brief description.

Figure 6:
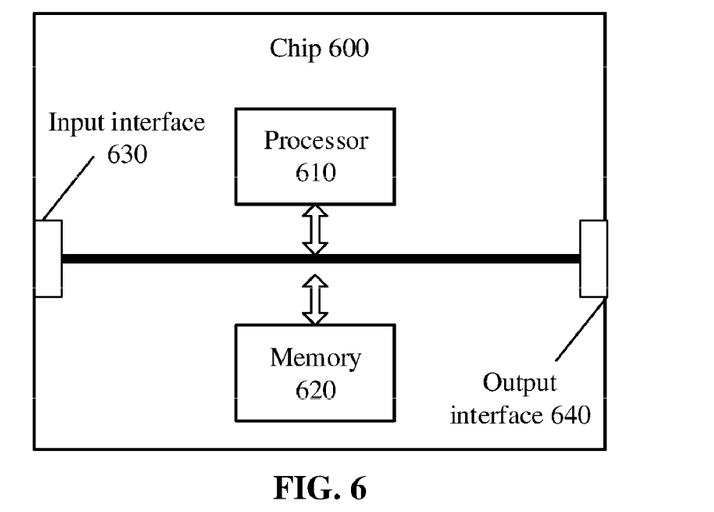
FIG. 6 illustrates a block diagram of a chip according to an embodiment of the disclosure.

FIG. 6 illustrates a block diagram of a chip according to an embodiment of the disclosure. As illustrated in FIG. 6, the chip 600 includes a processor 610. The processor 610 may call and execute the computer programs in a memory to execute the method in the embodiments of the disclosure.

In at least one embodiment, as illustrated in FIG. 6, the chip 600 may further include a memory 620. The processor

610 may call and execute the computer programs in the memory 620 to execute the method in the embodiments of the disclosure.

The memory 620 may be a separate device from the processor 610, or may be integrated into the processor 610.

In at least one embodiment, the chip 600 may further include an input interface 630. The processor 610 may control the input interface 630 to communicate with another device or chip. Specifically, the processor 610 may control the input interface 630 to obtain information or data from another device or chip.

In at least one embodiment, the chip 600 may further include an output interface 640. The processor 610 may control the output interface 640 to communicate with another device or chip. Specifically, the processor 610 may control the output interface 640 to send information or data to another device or chip.

In at least one embodiment, the chip may be applied to the network device in the embodiments of the disclosure. The chip may implement a corresponding process implemented by the network device in each method embodiment of the disclosure, which will not be elaborated herein for brief description.

In at least one embodiment, the chip may be applied to the terminal/mobile terminal in the embodiments of the disclosure. The chip may implement a corresponding process implemented by the terminal/mobile terminal in each method embodiment of the disclosure, which will not be elaborated herein for brief description.

It is to be understood that in the embodiments of the disclosure, the chip may also be referred to as a system level chip, a system chip, a chip system or a system-on-chip.

It is to be understood that in the embodiments of the disclosure, the processor may be an integrated circuit chip with a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any related processor and the like. The operations of the methods disclosed in combination with the embodiments of the disclosure may be directly embodied to be executed and completed by a hardware decoding processor, or executed and completed by a combination of hardware and software modules in the decoding processor. The software module may be located in a mature storage medium in the art, such as a Random Access Memory (RAM), a flash memory, a Read-Only Memory (ROM), a Programmable ROM (PROM), an Electrically Erasable PROM (EEPROM) or a register. The storage medium is located in the memory. The processor reads information in the memory, and completes the operations of the above methods in combination with hardware of the processor.

It may be understood that the memory in the embodiment of the disclosure may be a volatile memory or a non-volatile memory, or may include the volatile memory and the non-volatile memory. The non-volatile memory may be an ROM, a PROM, an Erasable PROM (EPROM), an EEPROM or a flash memory. The volatile memory may be an RAM and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of the system and the method described in the disclosure is intended to include but not limited to memories of these and any other suitable type.

The embodiments of the disclosure also provide a computer-readable storage medium for storing one or more computer programs.

In at least one embodiment, the computer-readable storage medium may be applied in the network device of the embodiments of the disclosure. The computer programs may enable a processor to perform the corresponding process implemented by the network device in each method embodiment of the disclosure, which will not be elaborated herein for brief description.

In at least one example, the computer-readable storage medium may be applied in the terminal/mobile terminal of the embodiments of the disclosure. The computer programs may enable a processor to perform the corresponding process implemented by the terminal/mobile terminal in each method embodiment of the disclosure, which will not be elaborated herein for brief description.

The embodiments of the disclosure also provide a computer program product. The computer program product includes one or more computer program instructions.

In at least one embodiment, the computer program product may be applied in the network device of the embodiments of the disclosure. The computer program instructions may enable a processor to perform the corresponding process implemented by the network device in each method embodiment of the disclosure, which will not be elaborated herein for brief description.

In at least one example, the computer program product may be applied in the terminal/mobile terminal of the embodiments of the disclosure. The computer program instructions may enable a processor to perform the corresponding process implemented by the terminal/mobile terminal in each method embodiment of the disclosure, which will not be elaborated herein for brief description.

The embodiments of the disclosure also provide a computer program.

In at least one embodiment, the computer program may be applied in the network device of the embodiments of the disclosure. The computer program, when executed by a processor, enables a processor to perform the corresponding process implemented by the network device in each method embodiment of the disclosure, which will not be elaborated herein for brief description.

In at least one example, the computer program may be applied in the terminal/mobile terminal of the embodiments of the disclosure. The computer program, when executed by a processor, enables a processor to perform the corresponding process implemented by the terminal/mobile terminal in each method embodiment of the disclosure, which will not be elaborated herein for brief description.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

What is claims is:

1. A method of determining a random access radio network temporary identifier (RA-RNTI), executed by a user equipment (UE), comprising:
    obtaining a first indication of a plurality of frequency domain random access occasions (ROs) M_RO over which physical random access channel (PRACH) preamble is transmitted;
    obtaining a second indication about a set of PRACH sequence candidates to be selected for PRACH preamble transmission;
    determining an initial RO index; and
    determining the RA-RNTI based on the initial RO index and a PRACH sequence transmitted over the plurality of frequency domain ROs M_RO, wherein the UE determines the RA-RNTI such that a value of the RA-RNTI has a first pre-defined relationship between on the initial RO index and a first offset, where the first offset has a second relationship with the transmitted PRACH sequence over the plurality of frequency domain ROs M_RO, wherein the first pre-defined relationship is RA-RNTI=1+s_id+14×t_id+14× 80×f_id_nru+14×80×8×ul_carrier_id,
    where s_id is an index of a first OFDM symbol of a PRACH occasion, 0≤s_id<14, t_id is an index of a first slot of the PRACH occasion in a system frame, 0≤t_id<80, f_id nru is an index of NRU PRACH occasion in a frequency domain, 0<f_id_nru <8, and ul_carrier_id is a UL carrier used for Random Access Preamble transmission, ul_carrier_id is 0 for NUL carrier, and ul_carrier_id is 1 for SUL carrier, and f_id_nru is derived by the initial RO index and the PRACH sequence transmitted over the plurality of frequency domain ROs M_RO according to the second relationship.

2. The method according to claim 1, wherein the plurality of frequency domain ROs M_RO have different frequency domain RO indexes or a same frequency domain RO index.

3. The method according to claim 2, wherein the UE determines the initial RO index such that:
    if the plurality of frequency domain ROs M_RO have the different frequency domain RO indexes, the initial RO index is a smallest RO index among them; or a largest RO index among them;
    if the plurality of frequency domain ROs M_RO have the same frequency domain RO index, the initial RO index is the frequency domain RO index.

4. The method according to claim 1, wherein the second relationship between the first offset and the PRACH sequence is derived by a PRACH sequence group, such that different PRACH sequences is divided into multiple groups, and each of the groups represents an offset value.

5. The method according to claim 4, wherein the offset value is group ID, or other pre-defined values linked to the group ID with pre-defined mapping.

6. An apparatus of determining a random access radio network temporary identifier (RA-RNTI), comprising:
    an obtaining unit, configured to obtain a first indication of a plurality of frequency domain random access occasions (ROs) M_RO over which physical random access channel (PRACH) preamble is transmitted, and obtain a second indication about a set of PRACH sequence candidates to be selected for PRACH preamble transmission; and
    a determination unit, configured to determine an initial RO index, and determine the RA-RNTI based on the initial RO index and the PRACH sequence transmitted over the plurality of frequency domain ROs M_RO, wherein the determination unit is configured to determine the RA-RNTI such that a value of the RA-RNTI has a first pre-defined relationship between on the initial RO index and a first offset, where the first offset has a second relationship with the transmitted PRACH sequence over the plurality of frequency domain ROs M_RO, wherein the first pre-defined relationship is RA-RNTI=1+s_id+14×t_id+14×80×f_id_nru+14×80×8×ul_carrier_id,
where s_id is an index of a first OFDM symbol of a PRACH occasion, 0≤s_id<14, t_id is an index of a first slot of the PRACH occasion in a system frame, 0≤t_id<80, f_id_nru is an index of an NRU PRACH occasion in the frequency domain, 0≤f_id_nru<8, and ul_carrier_id is a UL carrier used for Random Access Preamble transmission, ul_carrier_id is 0 for NUL carrier, and ul_carrier_id is 1 for SUL carrier, and f_id_nru is derived by the initial RO index and the PRACH sequence transmitted over the plurality of frequency domain M_RO according to the second relationship.

7. The apparatus according to claim 6, wherein the plurality of frequency domain ROs M_RO have different frequency domain RO indexes or a same frequency domain RO index.

8. The apparatus according to claim 7, wherein the determination unit is configured to determine the initial RO index such that:
   if the plurality of frequency domain ROs M_RO have the different frequency domain RO indexes, the initial RO index is a smallest RO index among them; or a largest RO index among them;
   if the plurality of frequency domain ROs M_RO have the same frequency domain RO index, the initial RO index is a frequency domain RO index.

9. The apparatus according to claim 6, wherein the second relationship between the first offset and the PRACH sequence is derived by a PRACH sequence group, such that different PRACH sequences is divided into multiple groups, and each of the groups represents an offset value.

10. The apparatus according to claim 9, wherein the offset value is group ID, or other pre-defined values linked to the group ID with pre-defined mapping.

11. A user equipment (UE), comprising:
   a memory storing a computer program; and
   a processor, adapted to call and execute the computer program stored in the memory to execute:
   obtaining a first indication of a plurality of frequency domain random access occasions (ROs) M_RO over which physical random access channel (PRACH) preamble is transmitted;
   obtaining a second indication about a set of PRACH sequence candidates to be selected for PRACH preamble transmission;
   determining an initial RO index; and
   determining the RA-RNTI based on the initial RO index and a PRACH sequence transmitted over the plurality of frequency domain ROs M_RO, wherein the processor determines the RA-RNTI such that a value of the RA-RNTI has a first pre-defined relationship between on the initial RO index and a first offset, where the first offset has a second relationship with the transmitted PRACH sequence over the plurality of frequency domain ROs M_RO, wherein the first pre-defined relationship is RA-RNTI=1+s_id+14×t_id+14×80×f_id_nru+14×80×8×ul_carrier_id,
   where s_id is an index of a first OFDM symbol of a PRACH occasion, 0≤s_id<14, t_id is an index of a first slot of the PRACH occasion in a system frame, 0≤t_id<80, f_id_nru is an index of NRU PRACH occasion in a frequency domain, 0≤f_id_nru<8, and ul_carrier_id is a UL carrier used for Random Access Preamble transmission, ul_carrier_id is 0 for NUL carrier, and ul_carrier_id is 1 for SUL carrier, and f_id_nru is derived by the initial RO index and the PRACH sequence transmitted over the plurality of frequency domain ROs M_RO according to the second relationship.

12. The UE according to claim 11, wherein the plurality of frequency domain ROs M_RO have different frequency domain RO indexes or a same frequency domain RO index.

13. The UE according to claim 12, wherein the processor determines the initial RO index such that:
   if the plurality of frequency domain ROs M_RO have the different frequency domain RO indexes, the initial RO index is a smallest RO index among them; or a largest RO index among them;
   if the plurality of frequency domain ROs M_RO have the same frequency domain RO index, the initial RO index is the frequency domain RO index.

14. The UE according to claim 11, wherein the second relationship between the first offset and the PRACH sequence is derived by a PRACH sequence group, such that different PRACH sequences is divided into multiple groups, and each of the groups represents an offset value.

15. The UE according to claim 14, wherein the offset value is group ID, or other pre-defined values linked to the group ID with pre-defined mapping.

* * * * *